April 14, 1936.  W. H. CHURCHILL  2,037,678
FASTENER INSTALLATION AND STUD MEMBER
Filed March 31, 1934
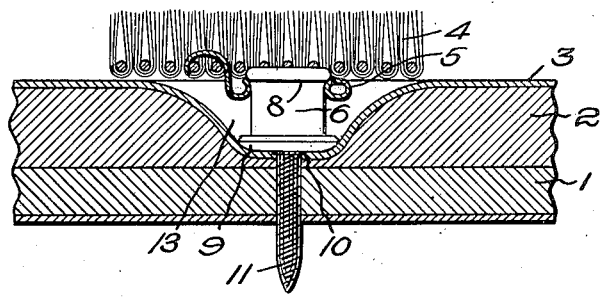
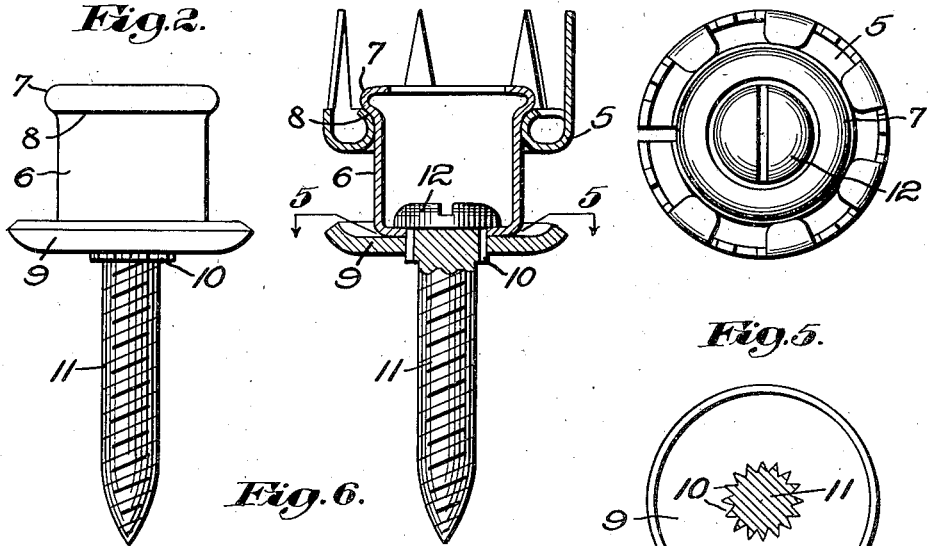
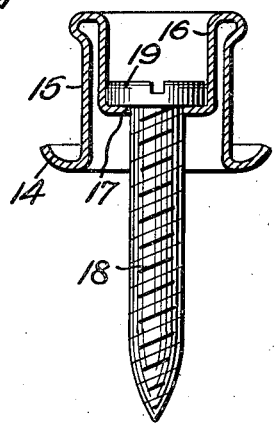
Inventor:
Wilmer H. Churchill.
by Walter S. Jones
Atty.

Patented Apr. 14, 1936

2,037,678

UNITED STATES PATENT OFFICE 2,037,678

FASTENER INSTALLATION AND STUD MEMBER

Wilmer H. Churchill, Saugus, Mass., assignor to United-Carr Fastener Corporation, Cambridge, Mass., a corporation of Massachusetts Application March 31, 1934, Serial No. 718,380

8 Claims. (Cl. 24—216)

My invention aims to provide improvements in snap fastener installations and stud members for the same.

In the drawing which illustrates preferred embodiments of my invention:—

Figure 1 is a vertical section through a typical installation embodying my invention, the stud member being shown in full;

Fig. 2 is a side elevation of my improved stud member;

Fig. 3 is a vertical section through the stud and socket units per se;

Fig. 4 is a plan view of Fig. 3;

Fig. 5 is a section taken on the line 5—5 of Fig. 3; and

Fig. 6 is a vertical section through a modified form of stud member.

The embodiment of my invention selected for illustration in the annexed drawing relates particularly, though not exclusively, to the installation of a carpet to a floor or the like upon which is superposed a padding such as is now commonly used as insulation around the floor and dash of a motor vehicle.

The particular embodiment of my invention, as illustrated in Fig. 1, includes a supporting structure 1, which may be the sheet metal floor or dash of a motor vehicle body, an insulating pad 2 of readily compressible material such as felt covered with a covering material 3 and a carpet 4 which overlaps at least a portion of the padded floor. Where the carpet is used it is desirable to hold it in position in such a manner that it cannot be accidentally displaced while being so fastened that it may be removed readily when desirable. In motor vehicles it has been the practice to secure the carpet to the floor by a snap fastener stud and socket. A common fastener for this purpose is shown in United States Letters Patent to Alfred F. Johnson No. 1,608,177, issued November 23, 1926. It has been found that that type of fastener, particularly the stud member, cannot be used satisfactorily where the carpet overlaps a portion of the floor which has been covered with an insulating pad, as shown in Fig. 1. The reason for this is that the stud becomes countersunk too far into the padding and is hugged too closely by the padding to permit easy attachment of the socket to the stud. Furthermore, if the socket is successfully attached to the stud a portion of the carpet is pulled down into the depression in the padding thereby presenting an uneven surface at each point where the carpet is attached. In order to overcome the difficulties encountered with the ordinary type of stud and socket, I have created a new stud member for engagement with the usual type of socket 5. This stud member may be constructed in a variety of ways but in any event certain improved features are essential.

My improved stud member, exclusive of the attaching means, may be made in a single piece, as shown in Fig. 6, or may be made from two or more pieces, as shown in Fig. 3, with the same improved results, the particular structure depending somewhat upon cost of manufacture and cost of materials to be used. I have found that the type of stud structure illustrated in Figs. 1 through 5 has proved commercially successful and can be manufactured with a minimum amount of tooling cost, although it should be understood that my invention is not necessarily limited to this particular arrangement.

The stud member illustrated by Figs. 1 through 5, inclusive, is provided with a socket-engaging part formed from sheet metal and which I shall term a cup-shaped member 6 having a substantially straight side wall, except adjacent to the upper or open end where the wall is flared outwardly in beaded form to provide a head 7 beneath which is formed an annular shoulder 8. At the bottom end of the cup-shaped member 6 there is located a washer 9 of substantial thickness and extending a substantial distance laterally beyond the wall of the cup-shaped member for purposes hereinafter described. The outer peripheral portion of this washer 9 is preferably curved upwardly in a direction toward the head 7 of the stud so that the washer of the stud is somewhat saucer-shaped, as clearly illustrated in Fig. 3. The cup-shaped member 6 and washer 9 may be secured together in any suitable manner, but I have found that this may be accomplished in an efficient and simple way by providing an annular series of flutes 10 on the shank 11 of the attaching member which in this instance is a screw having a head 12 located inside the cup-shaped member and bearing against the bottom thereof. The parts of the stud are secured together by passing the shank 11 of the attaching member through preformed apertures in the bottom of the cup-shaped member 6 and in the washer 9 and then driving the flutes 10 through the material of these parts adjacent to the apertures.

The distance between the washer 9 and the head 7 is such that when the stud member is attached by threading the shank 11 through the padding 2 and into engagement with the floor 1, as shown in Fig. 1, the head will be in about the plane of the upper surface of the padding. Furthermore, the padding will be engaged by the smoothly curved portion of the washer 9 as the padding is compressed thereby keeping the padding away from the stud proper and forming a recess 13 into which the socket may readily enter when forced over the head. Thus there is no interference with the socket by the padding during the socket and stud attaching operation, as will be apparent from an inspection of Fig. 1.

The stud member shown in Fig. 6 is used in the same manner as the stud member already described, but is constructed in a little different manner. In this instance the socket-engaging part and the washer are formed from a single piece of metal rather than being separate parts. Thus I have provided a stud unit having a base flange 14 having its outer peripheral portion curved upwardly the same as the washer 9 and for the same purpose. The socket engaging portion 15 is pressed from material at the center of the blank and the material at the center of the head is pressed inwardly to provide a cup-shaped portion 16 having an aperture 17 in the bottom thereof. The attaching screw illustrated in Fig. 6 has a shank 18 and a head 19. This screw may be held in assembled relation with the stud part in any suitable manner, but I have shown it as being held in position by friction due to a driving fit which takes place between the head 19 of the screw and the side wall of the cup-shaped portion 16 and also between the shank 18 of the screw, directly beneath the head, and the wall surrounding the aperture 17 in the base of the cup-shaped portion 16.

While I have illustrated and described preferred embodiments of my invention, I do not wish to be limited thereby, because the scope of my invention is best defined by the following claims.

I claim:

1. A snap fastener installation comprising, in combination, a rigid supporting member, a relatively thick compressible padding superposed upon said supporting member, a snap fastener stud having a flange at the bottom countersunk a substantial distance into said padding by compressing the padding, a head adjacent to the plane of the exposed surface of said padding, a neck below said head, an attaching member extending from said base through the padding and into engagement with the rigid supporting member, a carpet superposed upon said padding and a snap fastener socket extending from said carpet into engagement with the neck of said stud.

2. A snap fastener installation of the class described, including a relatively thick compressible padding superposed upon a supporting structure, a snap fastener stud member countersunk into said padding and secured in position by fastener-attaching member passing through the padding and engaging the supporting structure, said snap fastener stud member having outwardly extending means adjacent to the inner end thereof to engage the padding and space it from the stud member and a socket-engaging head at the other end of the fastener stud member in about the plane of the outer surface of the padding and a part superposed upon the padding and having a snap fastener socket at its under side extending into the space in the padding surrounding the snap fastener stud member and engaging the stud member beneath the head.

3. A snap fastener installation of the class described, including a relatively thick compressible padding superposed upon a supporting structure, a snap fastener stud member countersunk into said padding and secured in position by the shank of an attaching member passing through the padding and into the supporting structure, said stud member having a socket-engaging head at that end nearest the outer face of the padding and having a flange extending outwardly from the stud at the other end with its outer peripheral portion flaring toward the headed end of the stud to engage the padding and hold it away from the head of the stud without cutting the padding and a socket-carrying part superposed upon the padding and having a snap fastener socket at its under side extending into the space in the padding surrounding the snap fastener stud member and engaging the stud member beneath the head.

4. A snap fastener stud unit including a socket-engaging part formed from sheet metal and being substantially cup-shaped in form, a head at the open end of said socket-engaging part, said head being at a relatively great distance from the base of said part, an attaching member extending from the bottom of said stud and a washer of larger diameter than the base of said socket-engaging part extending from beneath said base for the purpose described.

5. A snap fastener stud unit including a socket-engaging part formed from sheet metal and being substantially cup-shaped in form, a bead-shaped head at the open end of said socket-engaging part, an attaching member extending from the bottom of said stud and a saucer-shaped washer of larger diameter than the base of said socket-engaging part extending from beneath said base for the purpose described.

6. A snap fastener stud unit including a socket-engaging part formed from sheet metal and being substantially cup-shaped in form, an outwardly extending bead at the open end of said cup-shaped form providing a stud head, said head located at a relatively great distance from the base of said cup-shaped form, a saucer-shaped washer of larger diameter than the base of the socket-engaging part and extending a substantial distance laterally beyond the side wall of the socket-engaging part and an attaching screw having a head located inside the socket-engaging part and a shank extending through the bottom thereof and through the washer, and said shank being provided with washer-engaging means to hold the parts of the stud unit together.

7. A snap fastener stud unit having a socket-engaging part and an attaching part assembled therewith, said socket-engaging part having a head at one end thereof, and outwardly extending flange means at the other end of said socket-engaging portion, said flange means having its outer peripheral portion flaring upwardly toward the headed end of said socket-engaging part for the purposes described.

8. A snap fastener stud unit having a socket-engaging part and an attaching part assembled therewith, said socket-engaging part having a head at one end thereof, and outwardly extending flange means at the other end of said socket-engaging portion, said flange means having its outer peripheral portion flaring upwardly toward the headed end of said socket-engaging part for the purposes described, and said attaching member being provided with a shank passing through an aperture in the socket-engaging part and having flutes driven into the material of the socket-engaging part surrounding the aperture through which the shank passes to hold the attaching member in assembled relation with the socket-engaging member.

WILMER H. CHURCHILL.